United States Patent
Lu et al.

(10) Patent No.: US 10,674,546 B2
(45) Date of Patent: Jun. 2, 2020

(54) METHOD FOR ESTABLISHING TRANSMISSION CHANNEL, MME, NETWORK ELEMENT DEVICE, SYSTEM AND STORAGE MEDIUM

(71) Applicant: ZTE Corporation, Shenzhen, Guangdong (CN)

(72) Inventors: Fei Lu, Guangdong (CN); Jinguo Zhu, Guangdong (CN); Shuang Liang, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 16/040,486

(22) Filed: Jul. 19, 2018

(65) Prior Publication Data
US 2018/0332636 A1  Nov. 15, 2018

Related U.S. Application Data

(63) Continuation of application No. PCT/CN2016/107779, filed on Nov. 29, 2016.

(30) Foreign Application Priority Data

Jan. 19, 2016  (CN) .......................... 2016 1 0033656

(51) Int. Cl.
*H04W 76/10* (2018.01)
*H04W 8/10* (2009.01)
(Continued)

(52) U.S. Cl.
CPC ............. *H04W 76/10* (2018.02); *H04W 8/10* (2013.01); *H04W 8/18* (2013.01); *H04W 48/16* (2013.01); *H04W 48/08* (2013.01)

(58) Field of Classification Search
CPC ......... H04W 76/10; H04W 8/18; H04W 8/10; H04W 8/00; H04W 48/08; H04W 48/16
(Continued)

(56) References Cited

U.S. PATENT DOCUMENTS

2017/0374604 A1* 12/2017 Stenfelt ................. H04L 63/107
2018/0084402 A1*  3/2018 Kunz ..................... H04L 67/20
(Continued)

FOREIGN PATENT DOCUMENTS

CN         102355743 A     2/2012
CN         103228025 A     7/2013
(Continued)

OTHER PUBLICATIONS

International Search Report and Written Opinion dated Feb. 14, 2017 for International Application No. PCT/CN2016/107779, filed on Nov. 29, 2016 (15 pages).
(Continued)

*Primary Examiner* — Rownak Islam
(74) *Attorney, Agent, or Firm* — Perkins Coie LLP (57) ABSTRACT

The present disclosure provides a method for establishing a transmission channel, a Mobility Management Entity (MME), a network element device and a system for establishing a transmission channel. The method includes: obtaining, by a Mobility Management Entity (MME), an identifier of a Service Capability Exposure Function (SCEF) entity; and initiating establishment of a non-Internet Protocol (IP) data transmission channel with the SCEF entity based on the identifier of the SCEF entity.

13 Claims, 7 Drawing Sheets

(51) Int. Cl.
  *H04W 8/18* (2009.01)
  *H04W 48/16* (2009.01)
  *H04W 48/08* (2009.01)

(58) Field of Classification Search
  USPC .......................................................... 370/329
  See application file for complete search history.

(56) References Cited

U.S. PATENT DOCUMENTS

2019/0028337 A1\* 1/2019 Ryu ........................ H04W 8/02
2019/0028866 A1\* 1/2019 Baek ....................... H04W 4/50

FOREIGN PATENT DOCUMENTS

| CN | 103945535 A | 7/2014 |
| CN | 104023327 A | 9/2014 |
| WO | 2014/183780 A1 | 11/2014 |

OTHER PUBLICATIONS

Extended Search Report dated Jan. 27, 2020 for European Application No. 16886098.9, filed Nov. 29, 2016 (6 pages).

\* cited by examiner

METHOD FOR ESTABLISHING TRANSMISSION CHANNEL, MME, NETWORK ELEMENT DEVICE, SYSTEM AND STORAGE MEDIUM

CROSS REFERENCE TO RELATED APPLICATIONS

This patent document is a continuation of and claims priority to International Patent Application No. PCT/CN2016/107779, filed on Nov. 29, 2016, which claims the benefit of priority of Chinese Patent Application No. 201610033656.2, filed on Jan. 19, 2016. The entire contents of the before-mentioned patent applications are incorporated by reference as part of the disclosure of this document.

TECHNICAL FIELD

The present disclosure relates to communication technology, and more particularly, to a method for establishing a transmission channel, a Mobility Management Entity (MME), a network element device, a system for establishing a transmission channel and a storage medium.

BACKGROUND

A standardization work group in the 3$^{rd}$ Generation Partnership Project (3GPP) is currently working on revolution of Packet Switch (PS) Core and Universal Mobile Telecommunication System Radio Access Network (UTRAN). This research topic, also known as System Architecture Evolution (SAE), aims to allow an Evolved Packet Core (EPC) to provide a higher transmission rate and a low transmission delay, while optimizing packets and supporting mobility management among Evolved UTRAN (E-UTRAN), UTRAN, Wireless Local Area Network (WLAN) and other non-3GPP access networks.

Figure 1:
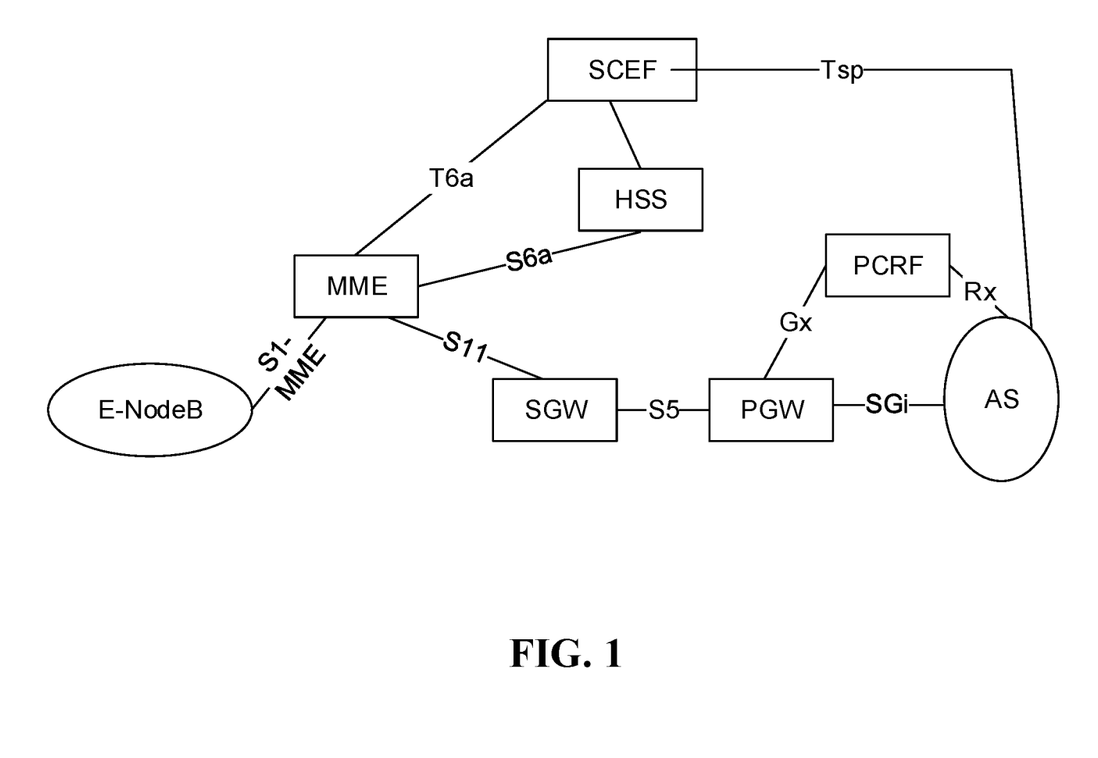
FIG. 1 is a schematic diagram showing the architecture of SAE in the related art.

FIG. 1 shows the current SAE architecture, including the following network element: an Evolved Radio Access Network (E-RAN), a packet data network and an Evolved Packet Core (E-Packet Core). The E-Packet Core includes the following network elements: a Mobility Management Entity (MME), a Serving Gateway (SGW), a Packet Data Network Gateway (PGW), a Policy and Charging Rules Function (PCRF) entity, a Home Subscriber Server (HSS) and a Service Capability Exposure Function (SCEF) entity.

When a User Equipment (UE) has a small data to be transmitted in the uplink, there is conventionally no procedure for the MME to trigger establishment of a non-Internet Protocol (IP) transmission channel. Hence, upon receiving an uplink non-IP data transmitted from the UE, the MME can either buffer it locally or discard it. When a Service Capability Server (SCS)/Application Server (AS) triggers establishment of a non-IP transmission channel, the MME can transmit the buffered uplink non-IP data to the SCS/AS. This requires additional storage at the MME and increases the MME's burden.

There is currently no solution to the above problem.

SUMMARY

In order to solve the above problems, the embodiments of the present disclosure provide a method for establishing a transmission channel, an MME, a network element device, a system and a storage medium.

In order to achieve the above object, the following solutions are provided according to the embodiments of the present disclosure.

According to an embodiment of the present disclosure, a method for establishing a transmission channel is provided. The method includes: obtaining, by an MME, an identifier of an SCEF entity; and initiating establishment of a non-IP data transmission channel with the SCEF entity based on the identifier of the SCEF entity.

In an embodiment, the method further includes, prior to the MME obtaining the identifier of the SCEF entity: receiving, by the MME, an attach request message from a UE or a Public Data Network (PDN) connection establishment request message.

In an embodiment, the MME obtaining the identifier of the SCEF entity includes: transmitting, by the MME, an Update Location request message; and receiving an Update Location acknowledgement message including the identifier of the SCEF.

In an embodiment, the MME obtaining the identifier of the SCEF entity includes: inquiring, by the MME, a Domain Name System (DNS) server about the identifier of the SCEF entity based on an Access Point Name (APN) or SCS/AS related information.

In an embodiment, the operation of initiating establishment of the non-IP data transmission channel with the SCEF entity based on the identifier of the SCEF entity includes: transmitting, by the MME, to the SCEF entity a non-IP data channel establishment request message based on the identifier of the SCEF entity; and receiving from the SCEF entity a non-IP data channel establishment confirmation message.

According to an embodiment of the present disclosure, a method for establishing a transmission channel is provided. The method includes: initiating, by an SCS/AS upon receiving an uplink data, establishment of a non-IP data transmission channel with an SCEF entity and a non-IP data transmission channel between the SCEF entity and an MME.

In an embodiment, the method further includes, prior to the SCS/AS initiating establishment of the non-IP data transmission channel with the SCEF entity and the non-IP data transmission channel between the SCEF entity and the MME: establishing, by the SCS/AS, an SGi channel with a PGW after completing establishment of a non-IP data transmission channel between the MME and the PGW.

According to an embodiment of the present disclosure, an MME is provided. The MME includes: a first communication unit configured to obtain an identifier of an SCEF entity; and a first processing unit configured to enable, after the first communication unit has obtained the identifier of the SCEF entity, the first communication unit to initiate establishment of a non-IP data transmission channel with the SCEF entity based on the identifier of the SCEF entity.

In an embodiment, the first communication unit is configured to, prior to obtaining the identifier of the SCEF entity: receive an attach request message from a UE or a PDN connection establishment request message.

In an embodiment, the first communication unit is configured to: transmit an Update Location request message; and receive an Update Location acknowledgement message including the identifier of the SCEF.

In an embodiment, the first communication unit is configured to: inquire a DNS server about the identifier of the SCEF entity based on an APN or SCS/AS related information.

In an embodiment, the first communication unit is configured to: transmit to the SCEF entity a non-IP data channel establishment request message based on the identifier of the SCEF entity; and receive from the SCEF entity a non-IP data channel establishment confirmation message.

According to an embodiment of the present disclosure, a network element device is provided. The network element device includes: a second communication unit configured to receive an uplink data; and a second processing unit configured to enable, after the second communication unit has received the uplink data, the second communication unit to initiate establishment of a non-IP data transmission channel with an SCEF entity and a non-IP data transmission channel between the SCEF entity and an MME.

In an embodiment, the second processing unit is configured to enable, prior to enabling the second communication unit to initiate establishment of the non-IP data transmission channel with the SCEF entity and the non-IP data transmission channel between the SCEF entity and the MME, the second communication unit to establish an SGi channel with a PGW after completing establishment of a non-IP data transmission channel between the MME and the PGW.

According to an embodiment of the present disclosure, a system for establishing a transmission channel is provided. The system includes: a first communication unit configured to obtain an identifier of an SCEF entity; a first processing unit configured to enable, after the first communication unit has obtained the identifier of the SCEF entity, the first communication unit to initiate establishment of a non-IP data transmission channel with the SCEF entity based on the identifier of the SCEF entity; a second communication unit configured to receive an uplink data; and a second processing unit configured to enable, after the second communication unit has received the uplink data, the second communication unit to initiate establishment of a non-IP data transmission channel with the SCEF entity and a non-IP data transmission channel between the SCEF entity and an MME. The first processing unit and the first communication unit are provided at the MME. The second processing unit and the second communication unit are provided at a network element device.

According to an embodiment of the present disclosure, a storage medium is provided. The storage medium stores computer executable instructions configured to perform the method applied in an MME for establishing a transmission channel according to the embodiment of the present disclosure.

According to an embodiment of the present disclosure, a storage medium is provided. The storage medium stores computer executable instructions configured to perform the method applied in a network element device (e.g., SCS/AS) for establishing a transmission channel according to the embodiment of the present disclosure.

With the method for establishing a transmission channel, MME, network element device, system and storage medium according to the embodiments of the present disclosure, when determining that a condition is met, an MME initiates establishment of a non-IP data transmission channel with an SCEF entity. In this way, the MME can trigger the establishment of the non-IP data transmission channel, thereby avoiding high requirements on the MME's storage capacity in the related art and reducing the MME's burden.

DETAILED DESCRIPTION OF THE EMBODIMENTS

In the following, the present disclosure will be described in detail with reference to the figures and the embodiments.

Figure 2:
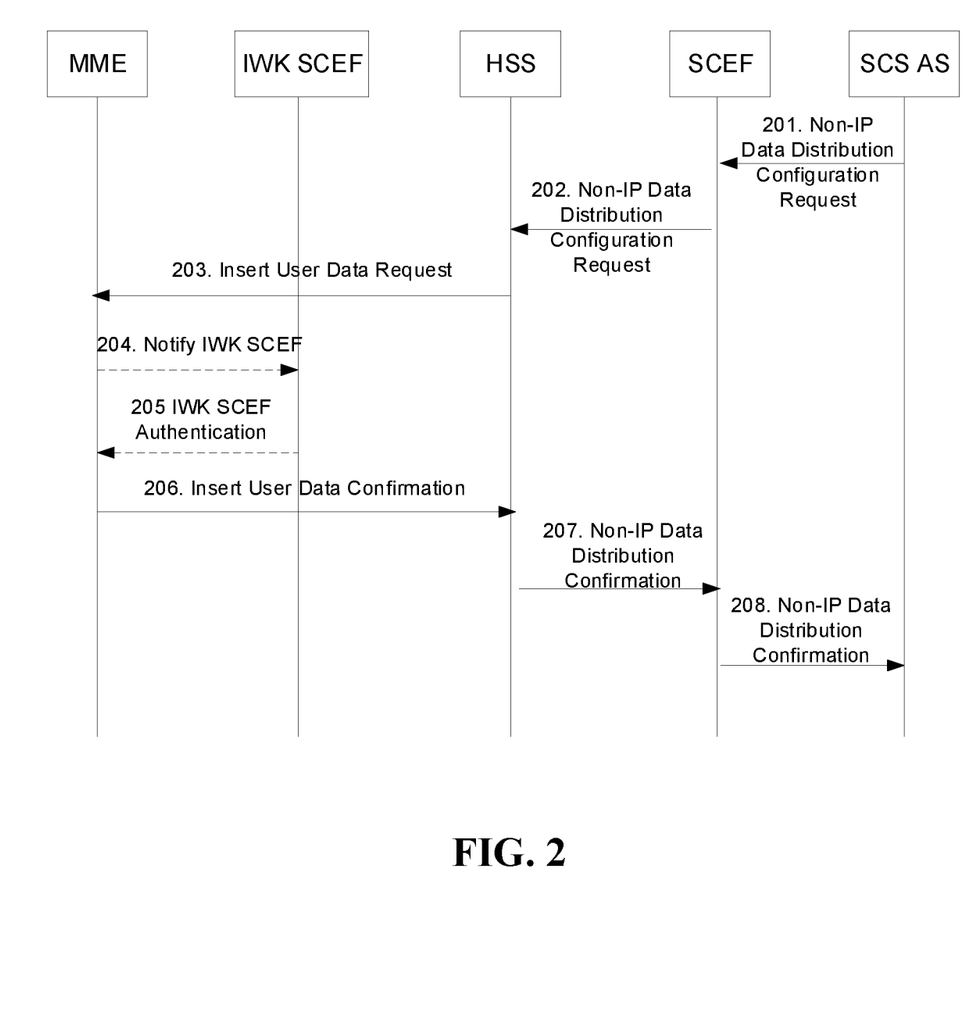
FIG. 2 is a flowchart illustrating a method for establishing a non-IP data channel according to an embodiment of the present disclosure.

FIG. 2 is a flowchart illustrating a method for establishing a non-IP data channel according to an embodiment of the present disclosure. As shown in FIG. 2, the method for establishing a non-IP data channel can be applied in an SCS or an AS. The method includes the following steps.

At step S201, when the SCS/AS needs to transmit downlink data to a UE, it transmits to an SCEF entity a non-IP data distribution configuration request message carrying an external identifier or a Mobile Station Integrated Services Digital Network Number (MSISDN), as well as an SCS/AS ID, an SCS/AS reference ID, a non-IP data distribution uplink destination address and a non-IP data indicator.

At step S202, the SCEF entity stores the SCS/AS ID, SCS/AS reference ID and non-IP data distribution uplink destination address and assigns an SCEF reference ID. The SCEF entity transmits to an HSS a non-IP data distribution configuration request message carrying the external identifier or MSISDN, the SCEF ID and the SCEF reference ID.

At step S203, the HSS stores the SCEF reference ID and the SCEF ID and transmits to an MME an insert user data request message carrying the SCEF ID and the SCEF reference ID.

At step S204, if the UE is in a roaming state and the current MME can only connect to an SCEF entity of another network via an Interworking-SCEF (IWK-SCEF), the MME transmits to the IWK SCEF a notification message carrying the SCEF ID, the SCEF reference ID and an address of the MME. If the MME does not need to connect to the SCEF entity via the IWK SCEF, this step and step S205 can be omitted.

At step S205, the IWK SCEF returns a confirmation message to the MME.

At step S206, the MME returns an insert user data response message to the HSS. If the steps S204 and S205 have been performed previously, the insert user data response message in this step carries an IWK SCEF ID.

At step S207, the HSS returns to the SCEF entity a non-IP distribution configuration response message carrying the SCEF reference ID. If the IWK SCEF ID has been obtained in the step S206, the non-IP distribution configuration response message in this step carries the IWK SCEF ID; otherwise it carries the address of the MME.

At step S208, the SCEF entity returns to the SCS/AS a non-IP distribution configuration response message carrying the SCS/AS reference ID.

In this way, a non-IP data transmission channel has been established among the MME, SCEF (IWK-SCEF) and SCS/AS.

It can be seen from the above steps that, when a UE has a small data to be transmitted in the uplink, there is conventionally no procedure for the MME to trigger establishment of a non-IP transmission channel. In view of this, the following embodiments are provided according to the present disclosure.

Embodiment 1

Figure 3:
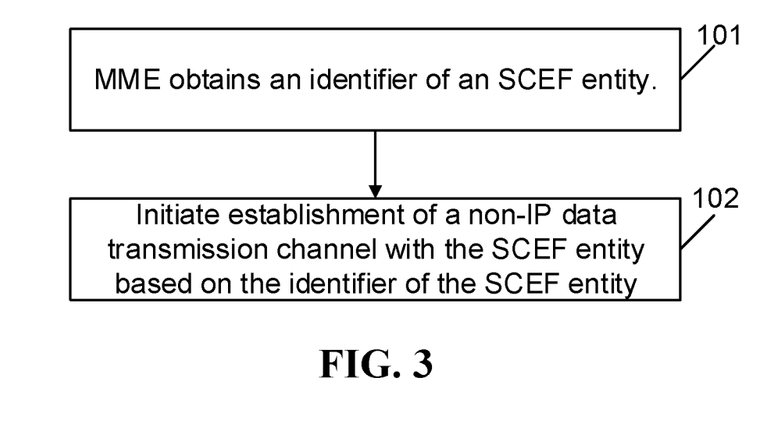
FIG. 3 is a flowchart illustrating a method for establishing a transmission channel according to Embodiment 1 of the present disclosure.

According to an embodiment of the present disclosure, a method for establishing a transmission channel is provided. FIG. 3 is a flowchart illustrating a method for establishing a transmission channel according to Embodiment 1 of the present disclosure. As shown in FIG. 3, the method includes the following steps.

At step 101, an MME obtains an identifier of an SCEF entity.

At step 102, establishment of a non-IP data transmission channel with the SCEF entity is initiated based on the identifier of the SCEF entity.

In particular, the method can further include, prior to the MME obtaining the identifier of the SCEF entity: receiving, by the MME, an attach request message from a UE or a PDN connection establishment request message.

As an implementation, the MME obtaining the identifier of the SCEF entity can include: transmitting, by the MME, an Update Location request message; and receiving an Update Location acknowledgment message including the identifier of the SCEF. In particular, the MME transmits the Update Location request message to an HSS for requesting the identifier of the SCEF entity (SCEF ID) and receives from the HSS the Update Location acknowledgement message including the identifier of the SCEF entity (SCEF ID). Here, the SCEF ID can be stored in a non-IP data transmission subscription data in the HSS. Alternatively, as in the step 202 in the related art, after the SCEF entity transmits the non-IP data distribution configuration request to the HSS, the HSS stores the SCEF ID.

As another implementation, if the MME fails to obtain the identifier of the SCEF entity (SCEF ID) from the HSS, i.e., if the Update Location acknowledgement message obtained by the MME does not contain the identifier of the SCEF entity (SCEF ID), the MME obtaining the identifier of the SCEF entity can include: inquiring, by the MME, a Domain Name System (DNS) server about the identifier of the SCEF entity based on an Access Point Name (APN) or SCS/AS related information. Here, in particular, the SCS/AS related information may include necessary information on an AS accessing entity, e.g., terminal application name information, or information on a provider of a video tool or a chatting tool. In particular, the MME can create a related Fully Qualified Domain Name (FQDN) based on the APN or the SCS/AS related information and inquire the DNS server about the SCEF ID based on the FQDN.

Based at least on the above implementations, the MME initiating establishment of the non-IP data transmission channel with the SCEF entity based on the identifier of the SCEF entity can include: transmitting, by the MME, to the SCEF entity a non-IP data channel establishment request message based on the identifier of the SCEF entity. Further, the MME receives from the SCEF entity a non-IP data channel establishment confirmation message.

In particular, the MME transmits to the SCEF entity a non-IP data channel establishment request message based on the identifier of the SCEF entity. The non-IP data channel establishment request message can include an address of the MME, an SCS/AS ID, an MSISDN or an external identifier. The SCEF entity transmits to the SCS/AS a non-IP data channel establishment request message including the MSISDN or the external identifier. The SCS/AS returns to the SCEF entity a non-IP data channel establishment response message including an SCS/AS reference ID. The SCEF entity assigns an SCEF reference ID and transmits to the MME a non-IP data channel establishment confirmation message including the SCEF reference ID via an IWK SCEF.

With the solution according to the embodiment of the present disclosure, the MME can trigger the establishment of the non-IP data transmission channel, thereby avoiding high requirements on the MME's storage capacity in the related art and reducing the MME's burden.

Embodiment 2

Figure 4:
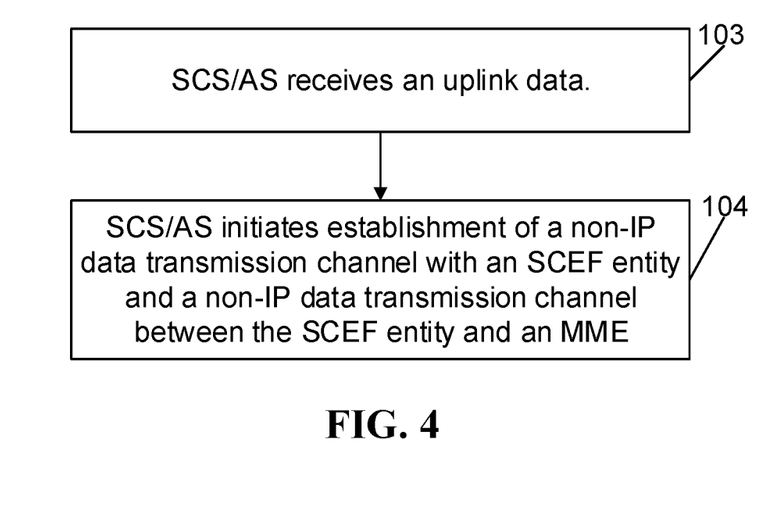
FIG. 4 is a flowchart illustrating a method for establishing a transmission channel according to Embodiment 2 of the present disclosure.

According to an embodiment of the present disclosure, a method for establishing a transmission channel is provided. FIG. 4 is a flowchart illustrating a method for establishing a transmission channel according to Embodiment 2 of the present disclosure. As shown in FIG. 4, the method includes the following steps.

At step 103, an SCS/AS receives an uplink data.

At step 104, the SCS/AS initiates establishment of a non-IP data transmission channel with an SCEF entity and a non-IP data transmission channel between the SCEF entity and an MME.

Here, the SCS/AS initiating establishment of the non-IP data transmission channel with the SCEF entity and the non-IP data transmission channel between the SCEF entity and the MME can include the following steps. The SCS/AS transmits a non-IP data channel establishment request message to the SCEF entity. The SCEF entity transmits a non-IP data distribution configuration request message to an HSS. The MME receives an insert user data request message from the HSS and transmits an insert user data response message to the HSS. The SCEF entity receives a non-IP data distribution configuration response message and transmits the non-IP data distribution configuration response message to the SCS/AS. The SCS/AS receives the non-IP data distribution configuration response message.

In this embodiment, the method can further include, prior to the SCS/AS initiating establishment of the non-IP data transmission channel with the SCEF entity and the non-IP data transmission channel between the SCEF entity and the MME: establishing, by the SCS/AS, an SGi channel with a PGW after completing establishment of a non-IP data transmission channel between the MME and the PGW.

In particular, after receiving an attach request message from a UE or a PDN connection establishment request message, if the MME fails to obtain information on the connected SCEF entity, it selects an appropriate PGW and an appropriate SGW based on an APN or SCS/AS related information. Here, the MME can create a related FQDN based on the APN or the SCS/AS related information and inquire a DNS server about an address of the PGW and an address of the SGW based on the FQDN. The MME can transmit a session establishment request message to the PGW via the SGW. The session establishment request message contains a non-IP data indicator and an MSISDN or an external identifier. The PGW transmits an SGi Point-to-Point (PtP) tunnel establishment request message to the SCS/AS. The SGS/AS returns an SGi PtP tunnel establishment response message to the PGW. The PGW returns a session establishment response message to the MME via the SGW. Then, the MME can transmit the received uplink non-IP data to the PGW and the SCS/AS. Further, upon receiving the uplink non-IP data, the SCS/AS transmits a non-IP data channel establishment request message to the SCEF entity. The non-IP data distribution configuration request message contains an external identifier or an MSISDN, as well as an SCS/AS ID, an SCS/AS reference ID, a non-IP data distribution uplink destination address and a non-IP data indicator. The SCEF entity assigns an SCEF reference ID and transmits to the HSS a non-IP data distribution configuration request message including the external identifier or MSISDN, the SCEF ID and the SCEF reference ID. The MME receives from the HSS an insert user data request message including the SCEF ID and the SCEF reference ID. The MME transmits an insert user data response message to the HSS. The SCEF entity receives from the HSS a non-IP data distribution configuration response message including the SCEF reference ID. The SCEF entity transmits a non-IP data distribution configuration response message to the SCS/AS. The SCS/AS receives the non-IP data distribution configuration response message. The non-IP data distribution configuration confirmation message contains the SCS/AS reference ID.

With the solution according to the embodiment of the present disclosure, the MME can trigger the establishment of the non-IP data transmission channel, thereby avoiding high requirements on the MME's storage capacity in the related art and reducing the MME's burden.

Embodiment 3

Figure 5:
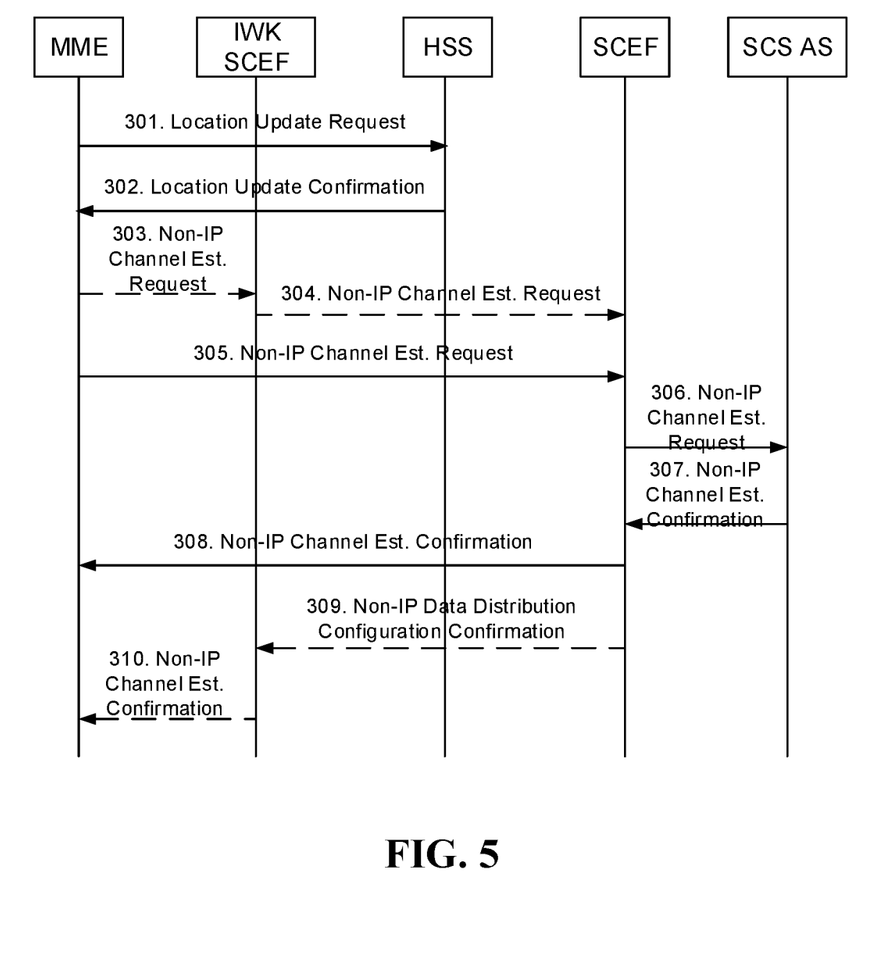
FIG. 5 is a flowchart illustrating a method for establishing a transmission channel according to Embodiment 3 of the present disclosure.

According to an embodiment of the present disclosure, a method for establishing a transmission channel is provided. FIG. 5 is a flowchart illustrating a method for establishing a transmission channel according to Embodiment 3 of the present disclosure. As shown in FIG. 5, the method includes the following steps.

At step 301, upon receiving an attach request message from a UE or a PDN connection establishment request message, an MME transmits an Update Location request message to an HSS for requesting an identifier of an SCEF entity (SCEF ID). The attach request message or PDN connection establishment request message carries a non-IP connection establishment indication. The attach request message or PDN connection establishment request message can also carry an APN or SCS/AS related information. Here, in particular, the SCS/AS related information may include necessary information on an AS accessing entity, e.g., terminal application name information, or information on a provider of a video tool or a chatting tool.

At step 302, the HSS returns to the MME an Update Location acknowledgement message including the SCEF ID and possibly an MSISDN or an external identifier. Here, the SCEF ID can be stored in a non-IP data transmission subscription data in the HSS. Alternatively, as in the step 202, after the SCEF entity transmits the non-IP data distribution configuration request to the HSS, the HSS stores the SCEF ID. Here, the external identifier is an identifier that can be used by a third party, e.g., outside a mobile network.

As another implementation, if the MME fails to obtain the SCEF ID in this step, the MME can inquire a DNS server about the SCEF ID based on the APN or SCS/AS related information.

At step 303, when the UE is in a roaming state and the MME can only connect to an SCEF of another network via an IWK-SCEF, the MME transmits to the IWK SCEF a non-IP data channel establishment request message including an address of the MME, an SCEF ID, an SCS/AS ID and the MSISDN or including the address of the MME, the SCEF ID, the SCS/AS ID and the external identifier. As another implementation, if the MME does not need to connect to the SCEF via the IWK SCEF, the method can proceed directly with step 305.

At step 304, based on the SCEF ID obtained in the step S303, the IWK SCEF transmits to the SCEF entity a non-IP data channel establishment request message including the SCS/AS ID and the MSISDN or including the SCS/AS ID and the external identifier.

At step 305, based on the SCEF ID, the MME transmits to the SCEF entity a non-IP data channel establishment request message including the address of the MME, the SCS/AS ID and the MSISDN or including the address of the MME, the SCS/AS ID and the external identifier.

At step 306, the SCEF entity transmits to the SCS/AS a non-IP data channel establishment request message including the MSISDN or the external identifier.

At step 307, the SCS/AS returns to the SCEF entity a non-IP data channel establishment response message including an SCS/AS reference ID.

At step 308, which is performed when the step 305 has been performed, the SCEF entity assigns an SCEF reference ID and transmits to the MME a non-IP data channel establishment confirmation message including the SCEF reference ID.

If the steps 304 and 305 have been performed, the method proceeds with steps 309 and 310.

At step 309, the SCEF entity assigns an SCEF reference ID and transmits to the IWK SCEF a non-IP data channel establishment confirmation message including the SCEF reference ID.

At step 310, the IWK SCEF transmits to the MME the non-IP data channel establishment confirmation message including the SCEF reference ID.

In this way, a non-IP data transmission channel has been established among the MME, SCEF (IWK-SCEF) and SCS/AS. Afterwards, the MME can transmit non-IP data over the non-IP data transmission channel among the MME, SCEF and SCS/AS.

With the solution according to the embodiment of the present disclosure, the MME can trigger the establishment of the non-IP data transmission channel, thereby avoiding high requirements on the MME's storage capacity in the related art and reducing the MME's burden.

Embodiment 4

Figure 6:
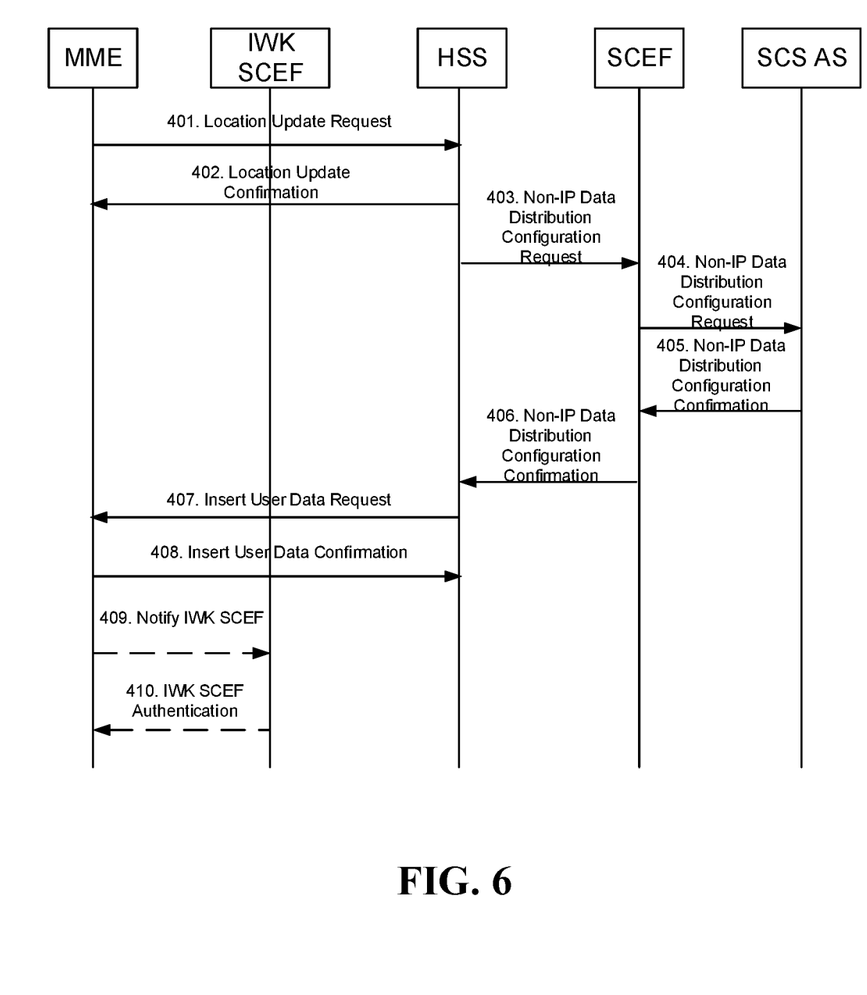
FIG. 6 is a flowchart illustrating a method for establishing a transmission channel according to Embodiment 4 of the present disclosure.

According to an embodiment of the present disclosure, a method for establishing a transmission channel is provided. FIG. 6 is a flowchart illustrating a method for establishing a transmission channel according to Embodiment 4 of the present disclosure. As shown in FIG. 6, the method includes the following steps.

At step 401, upon receiving an attach request message from a UE or a PDN connection establishment request message, an MME transmits an Update Location request message to an HSS for requesting an identifier of an SCEF entity (SCEF ID). The attach request message or PDN connection establishment request message carries a non-IP connection establishment indication. The attach request message or PDN connection establishment request message can also carry an APN or SCS/AS related information. The Update Location request message can further contain an address of the MME and an address of a configured IWK SCEF.

At step 402, the HSS returns to the MME an Update Location acknowledgement message including the SCEF ID and possibly an MSISDN or an external identifier. Here, the SCEF ID can be stored in a non-IP data transmission subscription data in the HSS. Alternatively, as in the step 202, after the SCEF entity transmits the non-IP data distribution configuration request to the HSS, the HSS stores the SCEF ID.

As another implementation, if the MME fails to obtain the SCEF ID in this step, the MME can inquire a DNS server about the SCEF ID based on the APN or SCS/AS related information. Here, in particular, the SCS/AS related information may include necessary information on an AS accessing entity, e.g., terminal application name information, or information on a provider of a video tool or a chatting tool. In particular, the MME can create a related FQDN based on the APN or the SCS/AS related information and inquire the DNS server about the SCEF ID based on the FQDN. If the MME obtains the SCEF ID in this way, it can transmit the obtained SCEF ID to the HSS via the Update Location request message in the step 401.

At step 403, the HSS transmits to the SCEF entity a non-IP data channel distribution configuration request message including one of the external identifier and the MSISDN or one of the address of the MME and the address of the IWK SCEF.

At step 404, the SCEF entity transmits to the SCS/AS a non-IP data channel distribution configuration request message including the MSISDN or the external identifier.

At step 405, the SCS/AS returns a non-IP data channel distribution configuration confirmation message to the SCEF entity.

At step 406, the SCEF entity assigns an SCEF reference ID and returns to the HSS a non-IP data channel distribution configuration confirmation message including the SCEF reference ID.

At step 407, the HSS transmits to the MME an insert user data request message including the SCEF ID and the SCEF reference ID.

At step 408, the MME returns an insert user data response message to the HSS.

At step 409, if the UE is in a roaming state and the MME can only connect to an SCEF entity of another network via an IWK-SCEF, the MME transmits to the IWK SCEF a notification message including the SCEF ID, the SCEF reference ID and the address of the MME. Alternatively, if the MME does not need to connect to the SCEF via the IWK SCEF, this step can be omitted.

At step 410, the IWK SCEF returns a confirmation message to the MME.

In this way, a non-IP data transmission channel has been established among the MME, SCEF (IWK-SCEF) and SCS/AS. Afterwards, the MME can transmit non-IP data over the non-IP data transmission channel among the MME, SCEF and SCS/AS.

With the solution according to the embodiment of the present disclosure, the MME can trigger the establishment of the non-IP data transmission channel, thereby avoiding high requirements on the MME's storage capacity in the related art and reducing the MME's burden.

Embodiment 5

Figure 7:
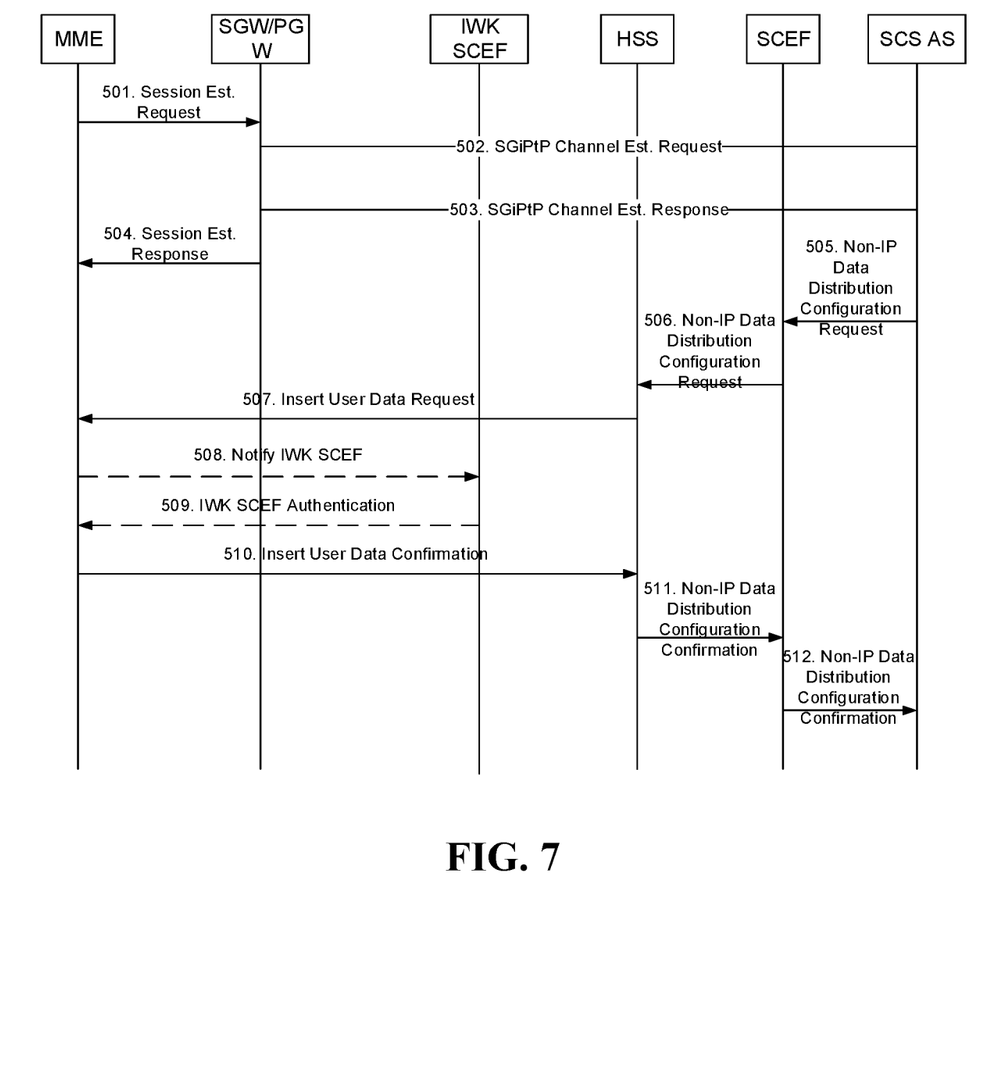
FIG. 7 is a flowchart illustrating a method for establishing a transmission channel according to Embodiment 5 of the present disclosure.

According to an embodiment of the present disclosure, a method for establishing a transmission channel is provided. FIG. 7 is a flowchart illustrating a method for establishing a transmission channel according to Embodiment 5 of the present disclosure. As shown in FIG. 7, the method includes the following steps.

At step 501, upon receiving an attach request message from a UE or a PDN connection establishment request message, if an MME fails to obtain information on a connected SCEF entity, it selects an appropriate PGW and an appropriate SGW based on an APN or SCS/AS related information. The attach request message or PDN connection establishment request message carries a non-IP connection establishment indication. The attach request message or PDN connection establishment request message can also carry the APN or the SCS/AS related information. The MME can transmit a session establishment request message to the PGW via the SGW. The session establishment request message contains a non-IP data indicator and an MSISDN or an external identifier.

At step 502, the PGW transmits an SGi Point-to-Point (PtP) tunnel establishment request message to the SCS/AS.

At step 503, the SGS/AS returns an SGi PtP tunnel establishment response message to the PGW.

At step 505, the PGW returns a session establishment response message to the MME via the SGW. Then, the MME can transmit the received uplink non-IP data to the PGW and the SCS/AS. Upon receiving the uplink non-IP data, the SCS/AS can trigger establishment of a connection with the SCEF entity.

At step 505, the SCS/AS transmits a non-IP data distribution configuration request message to the SCEF entity. The non-IP data distribution configuration request message contains the external identifier or the MSISDN, as well as an SCS/AS ID, an SCS/AS reference ID, a non-IP data distribution uplink destination address and a non-IP data indicator.

At step 506, the SCEF entity stores the SCS/AS ID, the SCS/AS reference ID and the non-IP data distribution uplink destination address, assigns an SCEF reference ID and transmits to an HSS a non-IP data distribution configuration request message including the external identifier or MSISDN, the SCEF ID and the SCEF reference ID.

At step 506, the SCEF entity stores the SCEF ID and the SCEF reference ID, and transmits to the MME an insert user data request message including the SCEF ID and the SCEF reference ID.

At step 508, if the UE is in a roaming state and the MME can only connect to an SCEF entity of another network via an IWK-SCEF, the MME transmits to the IWK SCEF a notification message including the SCEF ID, the SCEF reference ID and the address of the MME. Alternatively, if the MME does not need to connect to the SCEF via the IWK SCEF, this step can be omitted.

At step 509, the IWK SCEF returns a confirmation message to the MME.

At step 510, the MME transmits an insert user data confirmation message to the HSS. If the step 508 has been performed, the insert user data confirmation message in this step contains an IWK SCEF ID.

At step 511, the HSS transmits to the SCEF entity a non-IP distribution configuration confirmation message including the SCEF reference ID. If the IWK SCEF ID has been obtained in the step 510, the non-IP distribution configuration confirmation message contains the IWK SCEF ID; otherwise it contains the address of the MME.

At step 512, the SCEF entity transmits to the SCS/AS a non-IP distribution configuration confirmation message including the SCS/AS reference ID.

In this way, a non-IP data transmission channel has been established among the MME, SCEF (IWK-SCEF) and SCS/AS. Afterwards, the MME can transmit non-IP data over the non-IP data transmission channel among the MME, SCEF and SCS/AS.

With the solution according to the embodiment of the present disclosure, the MME can trigger the establishment of the non-IP data transmission channel, thereby avoiding high requirements on the MME's storage capacity in the related art and reducing the MME's burden.

Embodiment 6

Figure 8:
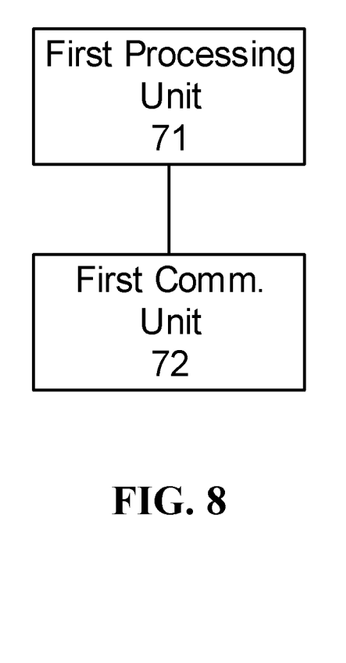
FIG. 8 is a block diagram showing a structure of an MME according to an embodiment of the present disclosure.

According to an embodiment of the present disclosure, an MME is provided. FIG. 8 is a block diagram showing a structure of an MME according to an embodiment of the present disclosure. As shown in FIG. 8, the MME includes a first processing unit 71 and a first communication unit 72.

The first communication unit 72 is configured to obtain an identifier of an SCEF entity.

The first processing unit 71 is configured to enable, after the first communication unit 72 has obtained the identifier of the SCEF entity, the first communication unit 72 to initiate establishment of a non-IP data transmission channel with the SCEF entity based on the identifier of the SCEF entity.

In particular, the first communication unit 72 can be configured to, prior to obtaining the identifier of the SCEF entity: receive an attach request message from a UE or a PDN connection establishment request message.

As an implementation, the first communication unit 72 can be configured to: transmit an Update Location request message; and receive an Update Location acknowledgement message including the identifier of the SCEF.

In particular, the first communication unit 72 can transmit the Update Location request message to an HSS for requesting the identifier of the SCEF entity (SCEF ID) and receives from the HSS the Update Location acknowledgement message including the identifier of the SCEF entity (SCEF ID). Here, the SCEF ID can be stored in a non-IP data transmission subscription data in the HSS. Alternatively, as in the step 202, after the SCEF entity transmits the non-IP data distribution configuration request to the HSS, the HSS stores the SCEF ID.

As another implementation, if the first communication unit 72 fails to obtain the identifier of the SCEF entity (SCEF ID) from the HSS, it can be configured to inquire a DNS server about the identifier of the SCEF entity based on an APN or SCS/AS related information. Here, in particular, the SCS/AS related information may include necessary information on an AS accessing entity, e.g., terminal application name information, or information on a provider of a video tool or a chatting tool. In particular, the MME can create a related FQDN based on the APN or the SCS/AS related information and inquire the DNS server about the SCEF ID based on the FQDN.

Based at least on the above implementations, the first communication unit 72 can be configured to transmit to the SCEF entity a non-IP data channel establishment request message based on the identifier of the SCEF entity. Further, the first communication unit 72 can be configured to receive from the SCEF entity a non-IP data channel establishment confirmation message.

In particular, the first communication unit 72 transmits to the SCEF entity a non-IP data channel establishment request message based on the identifier of the SCEF entity. The non-IP data channel establishment request message can include an address of the MME, an SCS/AS ID, an MSISDN or an external identifier. The SCEF entity transmits to the SCS/AS a non-IP data channel establishment request message including the MSISDN or the external identifier. The SCS/AS returns to the SCEF entity a non-IP data channel establishment response message including an SCS/AS reference ID. The SCEF entity assigns an SCEF reference ID and transmits a non-IP data channel establishment confirmation message including the SCEF reference ID via an IWK SCEF to the first communication unit 72 via an IWK SCEF.

In this embodiment, the first processing unit 71 in the MME can be implemented in practice by a Central Processing Unit (CPU), a Digital Signal Processor (DSP) or a Field Programmable Gate Array (FPGA) in the MME. The first communication unit 72 can be implemented by a transceiver antenna in the MME.

Embodiment 7

Figure 9:
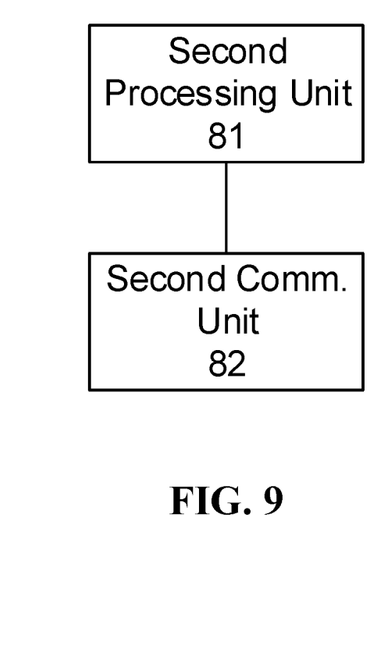
FIG. 9 is a block diagram showing a structure of an SCS/AS according to an embodiment of the present disclosure.

According to an embodiment of the present disclosure, a network element device is provided. In particular, the network element device can be an SCS/AS. FIG. 9 is a block diagram showing a structure of an SCS/AS according to an embodiment of the present disclosure. As shown in FIG. 9, the SCS/AS includes a second processing unit 81 and a second communication unit 82.

The second communication unit 82 is configured to receive an uplink data.

The second processing unit 81 is configured to enable, after the second communication unit 82 has received the uplink data, the second communication unit 82 to initiate establishment of a non-IP data transmission channel with an SCEF entity and a non-IP data transmission channel between the SCEF entity and an MME.

In this embodiment, the second processing unit 81 can be configured to enable, prior to enabling the second communication unit 82 to initiate establishment of the non-IP data transmission channel with the SCEF entity and the non-IP data transmission channel between the SCEF entity and the MME, the second communication unit 82 to establish an SGi channel with a PGW after completing establishment of a non-IP data transmission channel between the MME and the PGW.

In particular, after receiving an attach request message from a UE or a PDN connection establishment request message, if the MME fails to obtain information on the connected SCEF entity, it selects an appropriate PGW and an appropriate SGW based on an APN or SCS/AS related information. Here, the MME can create a related FQDN based on the APN or the SCS/AS related information and inquire a DNS server about an address of the PGW and an address of the SGW based on the FQDN. The MME can transmit a session establishment request message to the PGW via the SGW. The session establishment request message contains a non-IP data indicator and an MSISDN or an external identifier. The PGW transmits an SGi Point-to-Point (PtP) tunnel establishment request message to the SCS/AS. The SGS/AS returns an SGi PtP tunnel establishment response message to the PGW. The PGW returns a session establishment response message to the MME via the SGW. Then, the MME can transmit the received uplink non-IP data to the PGW and the SCS/AS. Further, upon receiving the uplink non-IP data, the second communication unit 82 of the SCS/AS transmits a non-IP data channel establishment request message to the SCEF entity. The non-IP data distribution configuration request message contains an external identifier or an MSISDN, as well as an SCS/AS ID, an SCS/AS reference ID, a non-IP data distribution uplink destination address and a non-IP data indicator. The SCEF entity assigns an SCEF reference ID and transmits to the HSS a non-IP data distribution configuration request message including the external identifier or MSISDN, the SCEF ID and the SCEF reference ID. The MME receives from the HSS an insert user data request message including the SCEF ID and the SCEF reference ID. The MME transmits an insert user data response message to the HSS. The SCEF entity receives from the HSS a non-IP data distribution configuration response message including the SCEF reference ID. The SCEF entity transmits a non-IP data distribution configuration response message to the SCS/AS. The second communication unit 82 receives the non-IP data distribution configuration response message. The non-IP data distribution configuration confirmation message contains the SCS/AS reference ID.

In this embodiment, the second processing unit 81 in the network element device can be implemented in practice by a CPU, a DSP or an FPGA in the network element device. The second communication unit 82 can be implemented by a transceiver antenna in the network element device.

Embodiment 8

According to an embodiment of the present disclosure, a system for establishing a transmission channel is provided. The system includes a first processing unit, a first communication unit, a second processing unit and a second communication unit.

The first communication unit is configured to obtain an identifier of an SCEF entity.

The first processing unit is configured to enable, after the first communication unit has obtained the identifier of the SCEF entity, the first communication unit to initiate establishment of a non-IP data transmission channel with the SCEF entity based on the identifier of the SCEF entity.

The second communication unit is configured to receive an uplink data.

The second processing unit is configured to enable, after the second communication unit has received the uplink data, the second communication unit to initiate establishment of a non-IP data transmission channel with the SCEF entity and a non-IP data transmission channel between the SCEF entity and an MME.

The first processing unit and the first communication unit are provided at the MME.

The second processing unit and the second communication unit are provided at a network element device.

It can be appreciated from the embodiments of the present disclosure that the disclosed devices and methods can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, each of these units can be a separate unit, or two or more units can be integrated into one unit. Such integrated unit can be implemented in hardware, possibly in combination with software functional units.

It can be appreciated by those skilled in the art that some or all of the steps in the method embodiments as described above can be implemented by hardware executing instructions of a program. Such program can be stored in a computer readable storage medium and, when executed, performs the steps of the above method embodiments. The storage medium may be any of various mediums capable of storing program codes, such as a mobile storage device, a Read Only Memory (ROM), a Random Access Memory (RAM), a magnetic disk or an optical disc.

Alternatively, when implemented in software function modules and sold or used as a standalone product, the above integrated units in the present disclosure can be stored in a computer readable storage medium. In view of this, the technical solutions according to the embodiments of the present disclosure, or in other words, a part thereof which is contributive over the prior art, can be embodied in a form of a software product. The computer software product can be stored in a storage medium, such as a mobile storage device, a ROM, a RAM, a magnetic disk, an optical disc or the like, including instructions which cause a computer device (which can be a personal computer, a server, a network device or the like) to perform the methods according to the embodiments of the present disclosure.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims as attached.

INDUSTRIAL APPLICABILITY

With the solutions according to the embodiments of the present disclosure, when determining that a condition is met, an MME initiates establishment of a non-IP data transmission channel with an SCEF entity. In this way, the MME can trigger the establishment of the non-IP data transmission channel, thereby avoiding high requirements on the MME's storage capacity in the related art and reducing the MME's burden.

What is claimed is:

1. A method for establishing a transmission channel, comprising:
 transmitting, by a Mobility Management Entity (MME), a first request message to a Home Subscriber Server (HSS);
 receiving, by the MME, a first acknowledgement message from the HSS, wherein the first acknowledgement message includes an identifier of a Service Capability Exposure Function (SCEF) entity; and initiating, by the MME, an establishment of a non-Internet Protocol (IP) data transmission channel by transmitting a second request message to the SCEF entity, wherein the second request message includes the identifier of the SCEF entity.

2. The method of claim 1, further comprising:
receiving, by the MME, an attach request message.

3. The method of claim 1, further comprising:
receiving, by the MME, a Public Data Network (PDN) connection establishment request message.

4. The method of claim 1, further comprising:
receiving, by the MME, a confirmation message from the SCEF entity in response to the second request message.

5. An apparatus for wireless communication comprised in a Mobility Management Entity (MME), comprising:
a transceiver configured to:
transmit a first request message to a Home Subscriber Server (HSS); and
receive a first acknowledgement message from the HSS, wherein the first acknowledgement message includes an identifier of a Service Capability Exposure Function (SCEF) entity; and
a processor configured to enable the transceiver to initiate an establishment of the non-Internet Protocol (IP) data transmission channel by transmitting a second request message for the SCEF entity, the second request message including the identifier of the SCEF entity.

6. The apparatus of claim 5, wherein the transceiver is configured to receive an attach request message.

7. The apparatus of claim 5, wherein the transceiver is configured to receive a Public Data Network (PDN) connection establishment request message.

8. The apparatus of claim 5, wherein the transceiver is configured to:
receive a confirmation message from the SCEF entity in response to the second request message.

9. The apparatus of claim 5, wherein the transceiver is configured to:
receive, from the SCEF entity, a confirmation message in response to the second request message.

10. A non-transitory storage medium storing computer executable instructions configured to perform a method for establishing a transmission channel, comprising:
transmitting, by a Mobility Management Entity (MME), a first request message to a Home Subscriber Server (HSS);
receiving, by the MME, a first acknowledgement message from the HSS, wherein the first acknowledgement message includes an identifier of a Service Capability Exposure Function (SCEF) entity; and
initiating, by the eMME, an establishment of a non-Internet Protocol (IP) data transmission channel by transmitting a second request message for the SCEF entity, wherein the second request message includes the identifier of the SCEF entity.

11. The non-transitory storage medium of claim 10, wherein the method further includes:
receiving an attach request message.

12. The non-transitory storage medium of claim 10, wherein the method further includes:
receiving a Public Data Network (PDN) connection establishment request message.

13. The non-transitory storage medium of claim 10, wherein the method further includes:
receiving a confirmation message from the SCEF entity in response to the second request message.

* * * * *